(12) United States Patent
Moser et al.

(10) Patent No.: US 6,971,481 B2
(45) Date of Patent: Dec. 6, 2005

(54) HYDRAULIC ELEVATOR WITH MOTOR CONTROLLED HYDRAULIC DRIVE AND METHOD FOR CONTROLLING THE HYDRAULIC ELEVATOR

(75) Inventors: Daniel Moser, Menzingen (CH); Richard von Holzen, Menzingen (CH)

(73) Assignee: Bucher Hydraulics AG, Neuheim (CH)

( * ) Notice: Subject to any disclaimer, the term of this patent is extended or adjusted under 35 U.S.C. 154(b) by 223 days.

(21) Appl. No.: 10/470,091

(22) PCT Filed: Nov. 7, 2002

(86) PCT No.: PCT/CH02/00600

§ 371 (c)(1),
(2), (4) Date: Jul. 23, 2003

(87) PCT Pub. No.: WO03/043923

PCT Pub. Date: May 30, 2003

(65) Prior Publication Data

US 2004/0074702 A1 Apr. 22, 2004

(30) Foreign Application Priority Data

Nov. 23, 2001 (CH) .................................... 2162/01

(51) Int. Cl.[7] ............................................. B66B 1/28
(52) U.S. Cl. ....................................... 187/285; 187/275
(58) Field of Search ............................... 187/272, 274, 187/273, 275, 215, 229, 234, 285–287; 91/452–455, 91/458, 459, 446; 92/DIG. 2; 60/413–418, 60/429, 430, 464

(56) References Cited

U.S. PATENT DOCUMENTS 2,269,786 A * 1/1942 Rose .......................... 187/274
3,892,292 A * 7/1975 Takenoshita et al. ....... 187/275

(Continued)

FOREIGN PATENT DOCUMENTS

DE 40 34 666 A1 10/1991

(Continued)

*Primary Examiner*—Jonathan Salata
(74) *Attorney, Agent, or Firm*—Cohen, Pontani, Lieberman & Pavane

(57) ABSTRACT

The invention relates to a hydraulic lift comprising a pressure accumulator (17). Hydraulic fluid can be transported between the pressure accumulator (17) and a hydraulic drive (2) by means of a pump (13), the rotational direction of the pump (13) being variable. According to the invention, there is no valve between the pressure accumulator (17) and the pump (13), and means are provided for preventing the pressure accumulator (17) from being discharged when the lift is at a standstill. In terms of said means, either a screw pump is used as a pump (13), or an electrically controllable leakage stop valve (31) is arranged in a leakage line (30) extending from a leakage port of the pump (13) to the tank (21), said stop valve being closed when the lift is at a standstill. The invention enables a hydraulic lift to be operated in an energy-saving and convenient manner, using a simple hydraulic circuit, and prevents the pressure accumulator (17) from being discharged when the lift is at a standstill.

10 Claims, 3 Drawing Sheets

U.S. PATENT DOCUMENTS

| | | | |
|---|---|---|---|
| 3,955,649 A * | 5/1976 | Takenoshita et al. | 187/285 |
| 5,281,774 A | 1/1994 | Masaki | |
| 5,579,868 A * | 12/1996 | Pelto-Huikko | 187/275 |
| 5,648,644 A * | 7/1997 | Nagel | 187/288 |
| 6,142,259 A | 11/2000 | Veletovac et al. | |
| 6,505,711 B1 * | 1/2003 | Zurcher et al. | 187/285 |
| 2003/0173159 A1 * | 9/2003 | Moser | 187/285 |

FOREIGN PATENT DOCUMENTS

| | | | |
|---|---|---|---|
| EP | 0 829 445 A1 | 3/1998 | |
| FR | 2 773 141 A1 | 7/1999 | |
| JP | 11343077 A * | 12/1999 | B66B 1/40 |
| WO | WO 98/34868 | 2/1998 | |
| WO | WO 01/14238 A1 | 8/1999 | |

* cited by examiner

HYDRAULIC ELEVATOR WITH MOTOR CONTROLLED HYDRAULIC DRIVE AND METHOD FOR CONTROLLING THE HYDRAULIC ELEVATOR

PRIORITY CLAIM

This is a U.S. national stage of application No. PCT/CH02/00600, filed on Nov. 07, 2002. Priority is claimed on that application and on the following application: Country: Switzerland, Application No.: 2162/01, Filed: Nov. 23, 2001.

BACKGROUND OF THE INVENTION

1. Field of the Invention

The invention concerns a hydraulic elevator having a hydraulic drive for moving a car, wherein a pump arranged between the hydraulic drive and a pressure accumulator controls the hydraulic drive. The invention also concerns a method of controlling and automatically regulating an elevator of this type.

2. Description of the Prior Art

WO-A1-01/14,238 describes a hydraulic elevator having a hydraulic drive with a pump connected for controlling the hydraulic drive. Hydraulic oil can be conveyed by a first pump to and from the hydraulic drive for the elevator, and hydraulic oil can be conveyed by a second pump to and from a pressure accumulator. The two pumps are rigidly connected to each other and can be driven jointly by an electric motor, whose speed can be varied. Between the first pump and the hydraulic drive, there is a relay-controllable valve, with which the rate of descent of the elevator car can be adjusted.

A hydraulic elevator is also known from DE-A1-40 34 666. Hydraulic oil is conveyed by a pump between the hydraulic drive for the elevator car and the pressure accumulator, which is a counterbalance elevator drive in this document. Each of the lines from the pump to the drive and from the pump to the pressure accumulator contains a speed adjustment valve, with which the operating curve can be controlled. It is also disclosed that the pump is driven by an electric motor, which is controlled by an inverter.

In EP-A1-829 445, a device is shown, in which, under certain conditions, the motor coupled with the pump acts as a generator, so that excess hydraulic energy is converted to electric energy and can thus be recovered.

U.S. Pat. No. 5,281,774 describes a control device for a hydraulic elevator, in which the electric motor that drives the pump is controlled by an inverter.

A hydraulic elevator with a pressure accumulator is also known from U.S. Pat. No. 5,579,868. In one of the embodiments of this elevator, a first pump is connected between the hydraulic drive for the elevator and the pressure accumulator, which is used to control the flow of hydraulic oil between the hydraulic drive and the pressure accumulator. The first pump is coupled with a hydraulic motor, by which a controllable split stream of the hydraulic oil flows to the tank, such that energy is produced from the pressure difference during the depressurization of the hydraulic oil from the hydraulic drive or pressure accumulator to the unpressurized tank, and this energy is used in the operation of the first pump. Hydraulic oil can be conveyed from the tank to the pressure accumulator to refill the pressure accumulator over and over again.

In WO 98/34,868, the pump for conveying hydraulic oil in a hydraulic elevator is operated by an electronic power regulating unit. Power regulating units of this type are also known as variable-frequency inverters.

Another device for operating a hydraulic elevator is known from WO 99/3,370. In this case, a pump and four line branches, each with an electrically actuated valve, are installed between the hydraulic drive and the pressure accumulator. When the elevator is moving up, two of the valves must be opened, and when it is moving down, the other two valves must be opened. The pressure accumulator apparently has three pressure spaces, which is more clearly evident from the application FR-A-2 773 141, on which the priority is based. How the speed is controlled remains unclear. It may be assumed that large pressure surges occur when the four electrically controllable valves are actuated.

The object of the invention is to simplify the hydraulic circuit and to lower the electric energy demand, especially the peak demand, i.e., the electric installed load, and to develop a control and automatic regulation method that allows an elevator of this type to be operated in an energy-saving and simultaneously comfortable way.

BRIEF DESCRIPTION OF THE DRAWINGS

Embodiments of the invention are explained in greater detail below with reference to the drawings.

DETAILED DESCRIPTION OF THE PRESENTLY PREFERRED EMBODIMENTS

Figure 1:
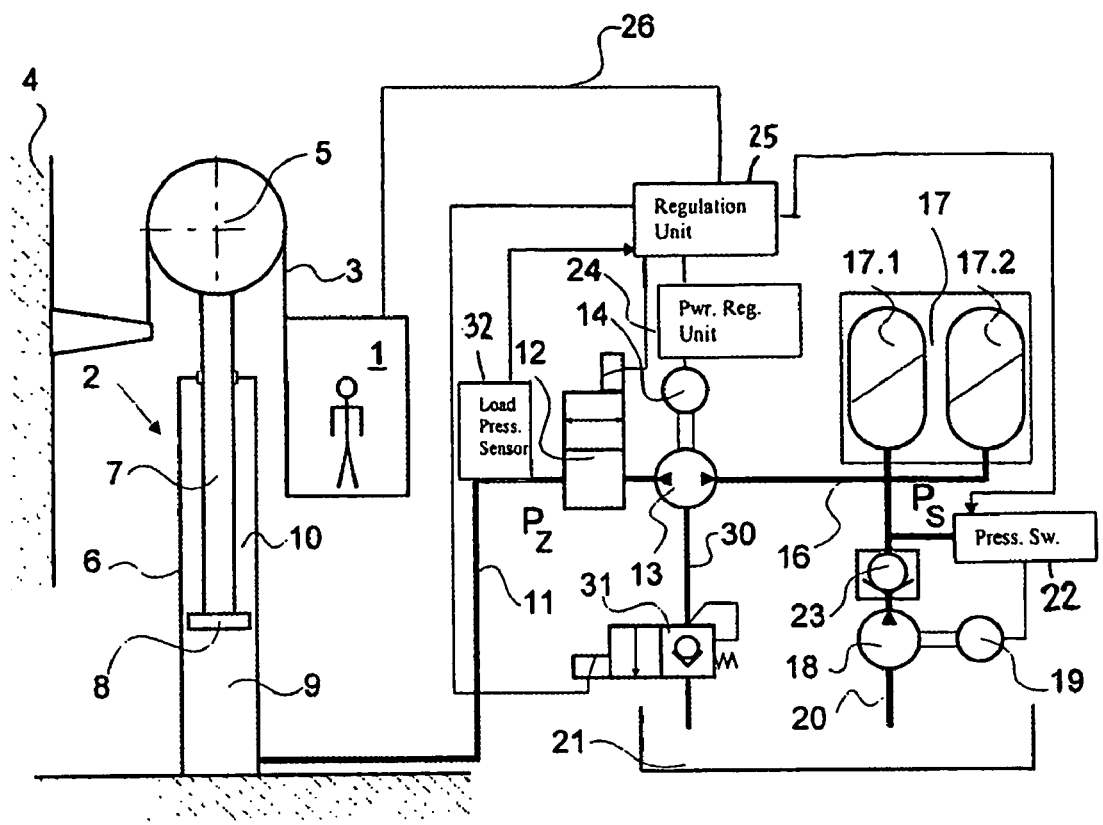
FIG. 1 is a block diagram of a hydraulic elevator according to the present invention.

In FIG. 1, an elevator car 1 can be moved by a hydraulic drive 2. Power is transmitted from the hydraulic drive 2 to the car 1 by the well-known means of a cable 3 that turns on a roller 5 mounted on the hydraulic drive 2. One end of the cable 3 is secured to a part of the building 4, but it may also be secured on the guide rails (not shown) for the elevator car 1. Different well-known arrangements of the cable 3 and rollers 5 are possible in accordance with the invention. In this regard, FIG. 1 shows only one example. Direct drive of the car 1 by the hydraulic drive 2, as shown in WO 98/34,868, is also possible.

The hydraulic drive 2 includes of a cylinder 6, in which a piston 8 mounted on a piston rod 7 can be moved. The end of the piston rod 7 opposite the piston 8 supports the roller 5. The interior space of the cylinder 6 is divided by the piston 8 into a first pressure space 9 and a second pressure space 10. The drive 2 of the embodiment shown here is a so-called plunger cylinder, in which the two pressure spaces 9 and 10 are connected. In other words, the piston 8 is not sealed against the inner wall of the cylinder 6. A seal is present at the point where the piston rod 7 extends from the hydraulic drive 2, which means that the pressure space 10 is sealed. In this cylinder design, the hydraulically effective cross section corresponds to the cross section of the piston rod 7.

A cylinder line 11 is connected to the first pressure space 9 and connects this pressure space 9 with a cylinder line stop valve 12. This cylinder line stop valve 12 is an electrically actuated on-off valve, i.e., for example, a solenoid valve.

The cylinder line stop valve 12 is connected on the other side with a pump 13, which is powered by an electric motor 14. The other connection of the pump 13 is connected to an accumulator line 16, which leads to a pressure accumulator 17, which comprises at least one pressure accumulator 17.1. The drawing shows another pressure accumulator 17.2, which is connected in parallel with the first pressure accumulator. The number of pressure accumulators 17.1, 17.2, 17.n contained in the pressure accumulator advantageously conforms, for example, to the required storage capacity, which is related to the maximum distance that must be traveled by the car 1. The greater the maximum possible travel distance is, the more pressure accumulators 17.1, 17.2, 17.n are contained in the pressure accumulator 17. Both bladder accumulators and piston accumulators may be considered for use as pressure accumulators 17.

A branch of the accumulator line 16 leads to a charging pump 18, which is powered by an electric motor 19. The charging pump 18 is also connected with a tank 21 by a tank line 20. Hydraulic oil can be conveyed from the tank 21 into the pressure accumulator 17 by the charging pump 18. It is advantageous for the electric motor 19 that drives the charging pump 18 to be automatically controlled by a pressure switch 22. The pressure switch 22 is installed in the accumulator line 16 and thus detects its pressure, which is designated $P_S$. If the pressure $P_S$ drops below a preset lower value, the pressure switch 22 turns on the electric motor 19, so that the charging pump 18 pumps hydraulic oil from the tank 21 into the pressure accumulator 17, which causes the pressure $P_S$ to rise until it has reached a preset upper value, after which the charging pump 18 is turned off again. Accordingly, the charging pump 18 must run only when the pressure $P_S$ in the pressure accumulator 17 is too low. The pressure $P_S$ can drop, on the one hand, as a result of unavoidable leakage losses through the charging pump 18 and, on the other hand, as a result of a drop in the temperature of the hydraulic oil due to environmental influences. If the temperature of the hydraulic oil rises due to environmental influences, the pressure $P_S$ also rises. Since this sort of temperature increase never happens very quickly, it would not be absolutely necessary to provide a pressure relief valve between the pressure accumulator 17 and the tank 21, by which hydraulic oil can be drained into the tank 20 if the pressure $P_S$ rises. The leakage losses of the charging pump 18 are sufficient in themselves to prevent the pressure $P_S$ from rising too sharply. Nevertheless, a pressure relief valve may be installed for safety reasons. It is advantageous to install a nonreturn valve 23 between the charging pump 18 and the pressure accumulator 17. This nonreturn valve 23 prevents leakage loss through the charging pump 18, and then the aforesaid pressure relief valve is necessary in any case. Additional system parts that are relevant to safety, such as pipe-break safety devices and emergency bleeding, are neither shown nor described, because these types of elements are irrelevant to the essence of the invention. As has already been mentioned, the pressure accumulator 17 is a bladder or piston accumulator. Its pressure $P_S$ varies as a function of the movement of the car 1. However, this is not a disadvantage with respect to the control and automatic regulation of the travel distance and speed of the car 1. It is possible to use well-known means to automatically regulate the travel distance and speed of the car 1, for example, to use the signal from a flowmeter (not shown here), which is placed in the cylinder line 11. However, this automatic regulation can also be accomplished by a sensor for the speed of the motor 14 or the speed of the car 1.

Advantageously, the predetermined values at which the pressure switch 22 turns the electric motor 19 on and off can be changed by a control/automatic regulation unit 25.

The pressure $P_Z$ present in the cylinder line 11 corresponds to the pressure in first pressure space 9 of the hydraulic drive 2. This pressure is correlated with the load of the car 1.

Since, in accordance with the invention, the pump 13 is installed between the cylinder line 11 and the accumulator line 16, when the cylinder line stop valve 12 is in the ON position during operation of the elevator, the pressure $P_Z$ in the cylinder line 11 and thus in the hydraulic drive 2 acts directly on the pump 13 on one side, and the pressure $P_S$ in the accumulator line 16 and thus in the accumulator 17 acts directly on the pump 13 on the other side. Thus, in contrast to the prior art, in which two adjustment valves are used to regulate the speed, only the single cylinder line stop valve 12 is necessary. The hydraulic circuit is thus clearly simplified compared to this prior art. Therefore, the electric power required for the motor 14 to drive the pump 13 is correlated with the pressure difference $P_Z-P_S$, when the pump 13 is pumping hydraulic oil from the pressure accumulator 17 to the hydraulic drive 2, and with the pressure difference $P_S-P_Z$, when the pump 13 is pumping hydraulic oil from the hydraulic drive 2 to the pressure accumulator 17. The pressure differences $P_Z-P_S$ and $P_S-P_Z$ can be negative by all means, in which case the pump 13 is driven by the pressure difference itself. In this way, the motor 14 can act as a generator, as is already well known. For this advantageous energy recovery to be possible, the motor 14 is driven by the well-known means of a power regulating unit 24, which, for example, is a variable-frequency inverter. The power regulating unit 24 is controlled by the control/automatic regulation unit 25, which in turn receives commands from an elevator control system, which is not shown in the drawing. Only the control line 26 is shown, through which the commands from the operating panel of the elevator system are transmitted to the control/automatic regulation unit 25.

If the elevator car 1 is stopped, the cylinder line stop valve 12, which can be actuated by the control/automatic regulation unit 25, is closed.

If the car 1 is to move downward, the control/automatic regulation unit 25 opens the cylinder line stop valve 12, and the motor 14 is operated in its first direction of rotation, so that the pump 13 pumps hydraulic oil from the pressure space 9 to the pressure accumulator 17. In this case, the pressure difference $P_S-P_Z$ acts across the pump. At the same time, this means that electric energy for the operation of the motor 14 must be consumed only as long as the pressure $P_Z$ is less than the pressure $P_S$. Since a speed adjustment valve is unnecessary, a corresponding pressure loss also does not occur. This has a positive effect on the overall efficiency and thus makes possible energy-saving operation of the elevator.

If the car 1 is to move upward, the control/automatic regulation unit 25 likewise opens the cylinder line stop valve 12, and the motor 14 is operated in its second direction of rotation, so that the pump 13 pumps hydraulic oil from the pressure accumulator 17 to the pressure space 9. In this case, the pressure difference $P_Z-P_S$ acts across the pump. At the same time, this means that electric energy for the operation of the motor 14 must be consumed only as long as the pressure $P_S$ is less than the pressure $P_Z$.

Since basically only an amount of electric drive power corresponding to the given pressure difference $P_S-P_Z$ or $P_Z-P_S$ must be consumed, the electric installed load for the motor 14 can be very much smaller than in conventional hydraulic circuits. Consequently, the motor 14 needed to operate the pump 13 can have a lower nominal rating. This results in cost advantages for the motor 14 itself, lower charges for the installed load due to the smaller installed load, and lower charges for power consumed due to the reduced consumption of electric energy. In accordance with the invention, another problem that is avoided is that once hydraulic oil has been brought to high pressure by a pump, it is not depressurized again in the direction of the tank 21 and thus does not give up or lose its potential energy.

Another advantage is that the tank 21 can be designed with small dimensions. It actually serves only to receive a differential amount of hydraulic oil that corresponds to the leakage losses. These leakage losses can drain into the tank through a leakage line 30. In accordance with the invention, a leakage stop valve 31 is installed in the leakage line 30. It can be controlled by the control/automatic regulation unit 25 and is advantageously designed as an on-off valve. When the elevator is stopped, the leakage stop valve 31 is closed. This prevents the pressure accumulator 17 from continuously discharging by the leakage of the pump 13 when the elevator is stopped. This discharging would represent a significant energy loss, which is prevented by the leakage stop valve 31.

The pressure $P_Z$ in the cylinder line 11 is detected by a load pressure sensor 32 and transmitted to the control/automatic regulation unit 25. The aforementioned pressure switch 22 evaluates the pressure $P_S$ in the accumulator line 16. The pressure switch 22 also has the function of a pressure sensor. The pressure in the accumulator line 16 that is determined in this way is also transmitted to the control/automatic regulation unit 25. The control/automatic regulation unit 25 thus knows the two pressures $P_Z$ and $P_S$ and is able to take these pressures into consideration in the control and automatic regulation of the elevator, which will be explained later.

The solution in accordance with the invention has the additional noteworthy advantage that a proportionally relay-controllable valve is not necessary to operate the hydraulic elevator. In many conventional hydraulic elevator systems, separate relay-controllable valves are present for upward and downward travel. Therefore, the open-loop and closed-loop control system is also very simple and easy to understand, because the speed of the car 1 is controlled and automatically regulated by only a single element, namely, the motor 14. In addition, only a single valve, namely, the cylinder line stop valve 12 is installed between the hydraulic drive 2 and the pressure accumulator 17. At least two valves are present in prior-art systems. Since basically any valve causes flow resistance, even in its open position, and this leads to pressure loss, from the energetic standpoint, it is especially advantageous if only a single valve is necessary. It was noted earlier that the cylinder line stop valve 12 must be opened to operate the elevator, i.e., to move the car 1. In other words, if the car 1 is to be started from a standstill, the cylinder line stop valve 12 must be opened. This operational situation, i.e., the opening of the cylinder line stop valve 12, is critical with respect to the pressure conditions and demands special control measures. The reasons for this are explained below.

When the car 1 is closed, the cylinder line stop valve 12 is initially closed. At the cylinder line stop valve 12, the pressure $P_Z$ is present on the side of the valve facing the drive 2, while the pressure $P_S$ is present on the side of the valve facing the pressure accumulator 17. After the car 1 has been stopped for an extended period of time, a pressure difference that previously existed across the pump 13 ceases to exist due to the leakage losses of the pump 13, so that there is now no pressure drop across the pump 13.

As a result of this, when the cylinder line stop valve 12 is opened, sudden pressure changes occur if the two pressures $P_Z$ and $P_S$ are not equal. This sudden pressure change causes unpleasant noises and also produces considerable stress on the pump 13, which can have an adverse effect on its operation and service life. As has already been mentioned, these problems are obviously also present in the object of WO-A-99/33,740, in which a total of four valves must be switched. The problems produced in this way are eliminated and comfortable operation is made possible by the control method described below.

That is one of the problems that arises in this advantageously simple hydraulic circuit. A second problem is the following. The pressure $P_S$ is always present at the connection of the pump 13 that faces the pressure accumulator 17. This pressure may be, for example, up to 150 bars. This necessarily results in leakage at the pump 13. This leakage may comprise two components, namely, the internal leakage, which is always present, from one connection of the pump 13 to the other connection, and the external leakage, which depends on the design of the pump 13 and, if it occurs, must be drained by the leakage line 30.

The internal leakage has no practical importance during operation of the pump 13, because it is very small compared to the delivery capacity of the pump. When the pump 13 is not running, and the cylinder line stop valve 12 is closed at the same time, the internal leakage is likewise unimportant, because its only effect is that the pressure on the side of the pump facing the cylinder line stop valve 12 becomes equal to the pressure $P_S$. However, due to the closed cylinder line stop valve 12, no hydraulic oil can flow off, apart from the minimal amount which served to equalize the pressure.

However, the external leakage of the pump 13 is very troublesome. Consequently, one of the essential features of the invention is either complete prevention of this external leakage or its elimination by special measures. If external leakage occurs at the pump 13 due to its design, it would cause hydraulic oil to drain through the leakage line 30 both when the pump 13 is operating and when it is not. As a result, therefore, the pressure accumulator 17 would continuously discharge, so that it would have to be repeatedly refilled by the charging pump 18. This is very unfavorable in regard to energy consumption. However, as has already been noted, this is prevented by the leakage stop valve 31 that is provided in an advantageous modification of the invention.

Figure 1A:
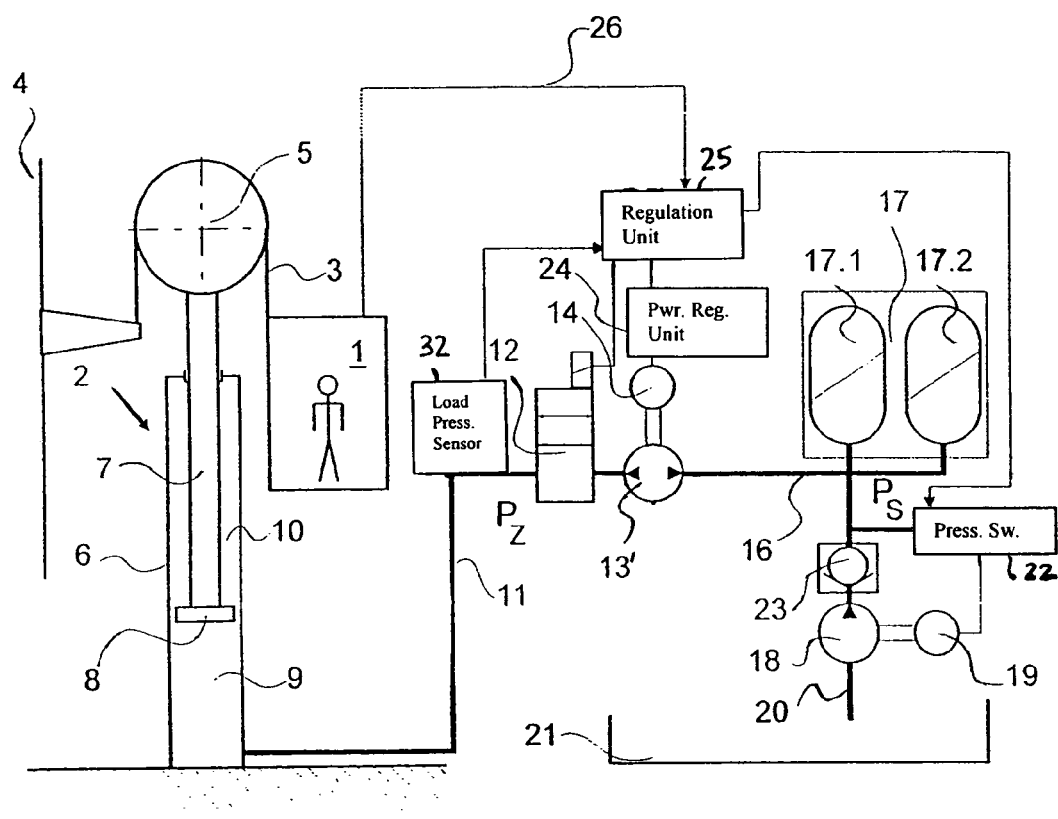
FIG. 1a is a block diagram of a hydraulic elevator using a screw pump.

The second solution in accordance with the invention shown in FIG. 1a includes using a screw pump 13'. In this embodiment, the leakage line 30 can be eliminated, because leakage occurs only between the high-pressure space and the low-pressure space of a the screw pump 13'. The invention thus provides alternative means of preventing external leakage, namely, either the use of a leakproof screw pump 13' (FIG. 1a) or the elimination of the leakage by the leakage stop valve 31 installed in the leakage line 30 (FIG. 1).

If the leakage stop valve 31 provided in conjunction with a pump 13 that is not leakage-free is closed, the pressure $P_S$ of the pressure accumulator 17 prevails inside the pump 31. This means that this pressure acts on the shaft packing of the pump 31. The pressure $P_S$ in the pressure accumulator 17 depends on the design of the hydraulic elevator. For energetic reasons, it is advantageous if the pressure $P_S$ in the pressure accumulator is chosen to correspond to the pressure $P_Z$ in the cylinder line 11 with the car 1 loaded at half its load capacity. Therefore, the maximum output to be produced by the pump 13 is correlated with half the load capacity of the car 1.

How large the pressure $P_Z$ and thus the pressure $P_S$ are depends on the type of drive of the car 1 and on the design of the hydraulic drive 2. If the car 1 is driven directly by the hydraulic drive 2, i.e., without conversion by a certain cable guide, this results in the lowest possible pressure, which then depends on the car's 1 own weight, on the load capacity, and on the hydraulically effective cross section of the hydraulic drive 2. The greater the hydraulically effective cross section of the hydraulic drive 2 is, the smaller are the resulting pressure $P_Z$ and thus $P_S$. With a conversion of 2:1 using the cable guide shown in FIG. 1, the pressure is about twice as great. At conversions of 3:1, 4:1, etc., a correspondingly higher pressure is obtained.

Figure 2:
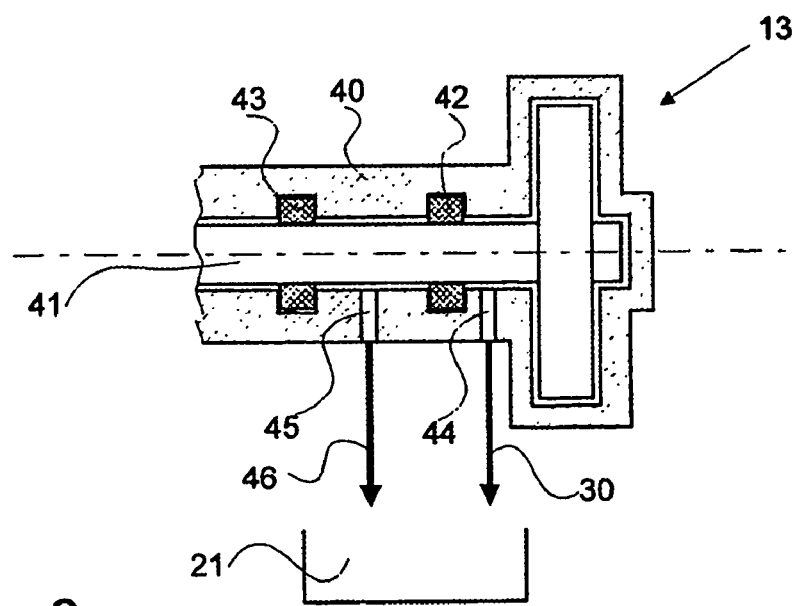
FIG. 2 is a schematic sectional diagram of a pump design for the elevator of FIG. 1.

Thus, depending on the design of the hydraulic elevator, a certain mean value of the pressures $P_Z$ and $P_S$ is obtained. Since the pressure $P_S$ acts on the shaft packing of the pump 13 when the leakage stop valve is closed, an advantageous design of the hydraulic elevator for higher pressures $P_Z$ and $P_S$ also requires that the pump 13 be able to withstand this pressure. Therefore, to be able to produce an advantageous design of the hydraulic elevator for higher pressures $P_Z$ and $P_S$, a special design of the pump 13 is necessary. FIG. 2 shows a schematic drawing of this sort of special design of the pump 13, by which the advantageous design of the hydraulic elevator is made possible.

The casing 40 of the pump 13 contains a shaft 41, which is common to the pump 13 and the motor 14 (FIG. 1). The shaft 41 is surrounded by a first shaft packing 42 and a second shaft packing 43, which are spaced some distance apart. From the interior of the pump 13, a first bore 44 leads to the leakage line 30, in which the leakage stop valve 31 is installed (not shown here—see FIG. 1). A relief bore 45 leads out of the casing 40 from the space surrounding the shaft 41 between the two shaft packings 42 and 43. It is connected to a residual leakage line 46, which leads to the tank 21.

When the leakage stop valve 31 (FIG. 1) is open, i.e., whenever the pump 13 is running, oil leakage can drain from the interior of the pump 13 to the tank 21. Consequently, the pressure developing around the shaft 41 before the first shaft packing 42 is only very small, so that the load on this first shaft packing 42 is also small.

If, on the other hand, as described earlier, the leakage stop valve 31 (FIG. 1) is closed and the pump is not running, the full pressure $P_S$ acts on the first shaft packing 42. The shaft packing 42 cannot withstand this pressure, and, as a result, a small amount of hydraulic oil penetrates the space surrounding the shaft 41 between the shaft packings 42 and 43. This very small amount drains into the tank 21 through the residual leakage line 46. It is extremely small compared to the amount of hydraulic oil that drains into the tank 21 with the leakage stop valve 31 (FIG. 1) open, which means that this small amount of residual leakage is insignificant and does not really discharge the pressure accumulator 17. The placement of the two shaft packings 42, 43 one after the other guarantees that no hydraulic oil gets into the surroundings of the pump 13. The two shaft packings 42, 43 withstand the pressure $P_S$ As has already been mentioned, in the initial state of the car 1, when it is stopped, the cylinder line stop valve 12 is closed, and the electric motor 14 of the pump 13 is not running. Pressure $P_Z$ prevails on one side of the cylinder line stop valve 12, and pressure $P_S$ prevails on the other. If the hydraulic elevator is designed as described above, the maximum pressure difference corresponds to a value that is equal to half the load capacity of the car 1. If the car 1 is loaded with half the load capacity, the difference is zero. If the car 1 is empty or loaded with less than half the load capacity, the pressure $P_S$ is greater than the pressure $P_Z$. If the car 1 is loaded with more than half the load capacity, the pressure $P_S$ is smaller than the pressure $P_Z$. Since the signals of the pressure switch 22 and the load pressure sensor 32 are supplied to the control/automatic regulation unit 25, the control/automatic regulation unit 25 knows the given load situation.

To prevent a sudden pressure change when the cylinder line stop valve 12 is opened, the control/automatic regulation unit can make sure that there is no pressure difference between the two connections of the cylinder line stop valve 12. This is done in the following way:

If the pressure $P_S$ is greater than the pressure $P_Z$, the control/automatic regulation unit 25 controls the motor 14 of the pump 13 via the power regulating unit 24 in such a way that the pump 13 runs at a very low speed of rotation in its first direction of rotation, with which it pumps hydraulic oil towards the accumulator line 16. However, since the cylinder line stop valve 12 is closed, the pump 13 does not convey an appreciable amount of hydraulic oil in this way. However, this slow rotation causes the pressure at the connection of the cylinder line stop valve 12 on the pump side to drop. As soon as the pressure is equal to the pressure $P_Z$, a pressure difference no longer exists across the cylinder line stop valve 12. The cylinder line stop valve 12 can then be opened without a pressure change occurring. The motor 14 remains magnetized at first by the power regulating unit 24, so that the pump 13 would be able to absorb torque. The car 1 can then start to move with the cylinder line stop valve 12 open, which is accomplished by well-known means by automatic regulation of the direction of rotation and speed of the motor 14 with the aid of the power regulating unit 24.

If the pressure $P_S$ is smaller than the pressure $P_Z$, the control/automatic regulation unit 25 controls the motor 14 of the pump 13 via the power regulating unit 24 in such a way that the pump 13 runs at a very low speed of rotation in its second direction of rotation, with which it pumps hydraulic oil from the accumulator line 16 towards the hydraulic drive 2. However, since the cylinder line stop valve 12 is closed, the pump 13 does not convey an appreciable amount of hydraulic oil in this way. However, this slow rotation causes the pressure at the connection of the cylinder line stop valve 12 on the pump side to rise. As soon as the pressure is equal to the pressure $P_Z$, a pressure difference no longer exists across the cylinder line stop valve 12. The cylinder line stop valve 12 can then also be opened in this situation without a pressure change occurring. The motor 14 again remains magnetized at first by the power regulating unit 24, so that the pump 13 can absorb torque. The car 1 can then start to move with the cylinder line stop valve 12 open, which is again accomplished by well-known means by automatic regulation of the direction of rotation and speed of the motor 14 with the aid of the power regulating unit 24.

When the leakage stop valve 31 is closed, the pressure $P_S$ acts on its side facing the pump 13, while atmospheric pressure acts on the side facing the tank 21, because the tank 21 is open. When the leakage stop valve 31 is opened, this pressure difference is removed. Surprisingly, it was found that this opening of the leakage stop valve 31 does not lead to unpleasant and disruptive shocks due to the sudden reduction of pressure. The reason for this may be that, although the pressure reduction occurs rapidly, it is not accompanied by a significant flow of hydraulic oil. Specifically, if the leakage stop valve 31 is opened, practically no afterflow of hydraulic oil can occur, because the internal resistance inside the pump 13 acts as a throttle point in this case. Accordingly, when the leakage stop valve 31 is opened, only the amount of hydraulic oil present between the pump 13 and the leakage stop valve 31 is depressurized. To ensure that this amount is small, it is advantageous to install the leakage stop valve 31 close to the pump 13.

The above-described method of preparing to run the elevator car 1 is carried out in the same way regardless of whether the car 1 is to travel up or down.

Figure 3A:
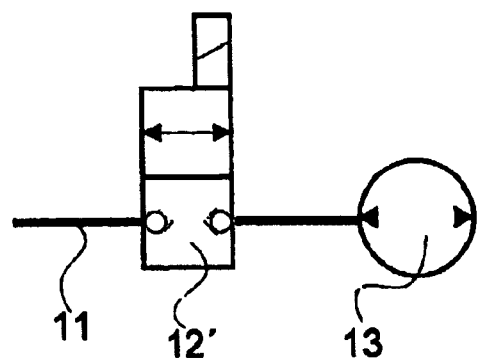
FIGS. 3a to 3c show cylinder line stop valves which may be used in the elevator of FIG. 1.

FIG. 3 shows three alternative solutions with respect to the cylinder line stop valve 12. FIG. 3a shows a cylinder line stop valve 12, whose symbolic representation indicates that it is a double-stopping on-off stop valve. Flow can be achieved only if the cylinder line stop valve 12 is electrically controlled. Therefore, it must be electrically controlled for both upward travel and downward travel of the car 1. This special modification of the cylinder line stop valve 12 is therefore designated cylinder line stop valve 12'.

Figure 3B:
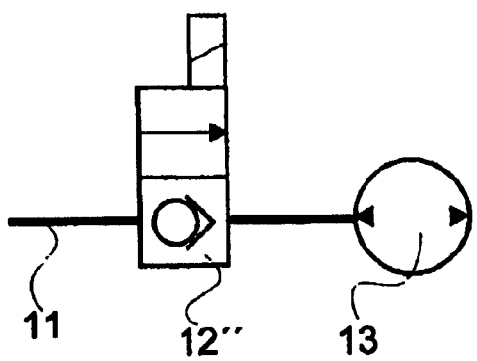

FIG. 3b shows another cylinder line stop valve 12, whose symbolic representation indicates that it is a single-stopping on-off stop valve. Therefore, this alternative embodiment of the cylinder line stop valve 12 is designated cylinder line stop valve 12". It is designed in such a way that it automatically opens when the pump 13 pumps hydraulic oil into the cylinder line 11. As soon as the pump 13 stops pumping, it closes again. The flow of hydraulic oil from the cylinder line 11 in the direction of the pump 13, on the other hand, is possible only when the cylinder line stop valve 12" is electrically actuated. A nonreturn valve may thus be integrated in the cylinder line stop valve 12".

Figure 3C:
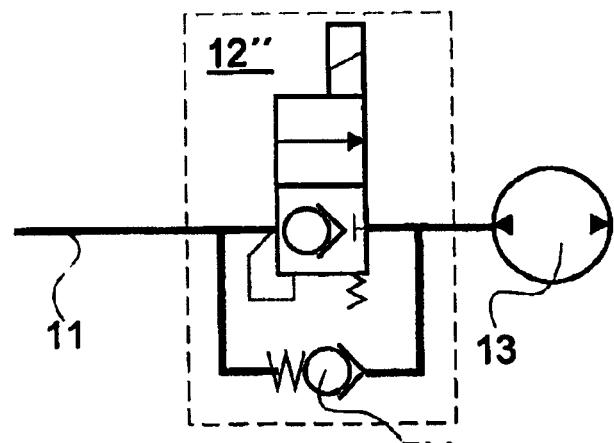

Alternatively, however, the cylinder line stop valve 12" may consist of an on-off valve and a nonreturn valve RV connected in parallel with it, as illustrated in FIG. 3c. The combination of the on-off valve and the parallel-connected nonreturn valve RV then constitutes the cylinder line stop valve 12".

If a cylinder line stop valve 12" of this type is used, the cylinder line stop valve 12" does not need to be electrically controlled when the pump 13 is pumping hydraulic oil in the direction of the hydraulic drive 2 (FIG. 1). This constitutes an advantage if the cylinder line stop valve 12" then opens automatically. In this way, the above-described problem of a sudden pressure change cannot even arise. Thus, the procedure described earlier for equalizing the pressure difference before the cylinder line stop valve 12 is opened does not have to be carried out at all.

For upward travel of the car 1, the cylinder line stop valve 12" requires no electrical actuation at all, for it automatically remains open as long as the pump 13 is pumping hydraulic oil in the direction of the hydraulic drive 2. If the motor 14 is shut off at the end of the upward travel of the car 1, the cylinder line stop valve 12" closes automatically.

Screw pumps 13' used in the embodiment of FIG. 1a are already being used for hydraulic elevators in the state of the art. Although these pumps have no external leakage, the engineering world has not discovered the solution in accordance with the present invention.

However, in a hydraulic elevator with the designs described above, it may also be advantageous to use an internal gear pump as the pump 13, because this type of pump has a compact design and very good volumetric efficiency and overall efficiency. In this case, however, the measures in accordance with the alternative modification of the invention are necessary, namely, the leakage stop valve 31. In this regard, it is advantageous to use a pump 13 of such a design that the external leakage is small.

The embodiments shown above are executed with a specific cable arrangement and with a plunger cylinder as the hydraulic drive 2. However, as was noted at the beginning, with respect to the equipment and method, the solutions in accordance with the invention are not limited to these solutions. Both direct drive of the elevator car 1 by the hydraulic drive 2 and other designs of the hydraulic drive 2, such as drawing or compressing cylinders and double-acting cylinders, are accessible to the advantageous developments in accordance with the invention.

What is claimed is:

1. A hydraulic elevator, comprising:
a hydraulic drive for moving a car;
a pressure accumulator;
a pressure switch connected for detecting pressure in said pressure accumulator;
a pump connected to said pressure accumulator by an accumulator line and connected to said hydraulic drive by a cylinder line for producing a flow of hydraulic fluid between said hydraulic drive and said pressure accumulator for moving the car, wherein said pump is directly connected to said pressure accumulator by said accumulator line;
a motor connected to said pump and driven by a power regulating unit for driving said pump;
a control/automatic regulation unit generating a signal for controlling said power regulating unit;
a tank holding a hydraulic fluid;
a charging pump driven by an electric motor for charging said pressure accumulator with hydraulic fluid from said tank in response to said pressure switch;
a cylinder line stop valve comprising an electrically switchable on-off valve connected between said cylinder line and said pump; and
means for preventing discharge of said pressure accumulator when said elevator is stopped.

2. The hydraulic elevator of claim 1, wherein said pump comprises a screw pump, said means for preventing discharge of said pressure accumulator comprising said screw pump.

3. The hydraulic elevator of claim 1, wherein said pump comprises a leakage connection, wherein a leakage line connected to said leakage connection leads to said tank, said means for preventing discharge of said pressure accumulator comprising a leakage stop valve connected in said leakage line and controlled by said control/automatic regulation unit.

4. The hydraulic elevator of claim 3, wherein said leakage stop valve comprises an on-off valve.

5. The hydraulic elevator of claim 4, wherein pump comprises a shaft having a first shaft packing and a second shaft packing, said first shaft packing being arranged closer to said pump, said leakage connection comprises a first bore connected to said leakage line and a relief bore arranged between said first and second shaft packing and connected to a residual leakage line leading to said tank.

6. The hydraulic elevator of claim 5, wherein said leakage stop valve is connected proximate said pump for minimizing an amount of hdraulic fluid between said pump and said leakage stop valve.

7. The hydraulic elevator of claim 4, wherein said leakage stop valve is connected proximate said pump for minimizing an amount of hdraulic fluid between said pump and said leakage stop valve.

8. The hydraulic elevator of claim 3, wherein said leakage stop valve is connected proximate said pump for minimizing an amount of hdraulic fluid between said pump and said leakage stop valve.

9. The hydraulic elevator of claim 3, wherein pump comprises a shaft having a first shaft packing and a second shaft packing, said first shaft packing being arranged closer to said pump, said leakage connection comprises a first bore connected to said leakage line and a relief bore arranged between said first and second shaft packing and connected to a residual leakage line leading to said tank.

10. A method for controlling and automatically regulating a hydraulic elevator having a hydraulic drive for moving a car, a pressure accumulator, a pressure switch connected for detecting pressure in the pressure accumulator, a pump connected to the pressure accumulator by an accumulator line and connected to the hydraulic drive by a cylinder line for producing a flow of hydraulic fluid between the hydraulic drive and the pressure accumulator for moving the car, a motor connected to said pump and driven by a power regulating unit for driving said pump, and a control/automatic regulation unit generating a signal for controlling said power regulating unit, said method comprising the steps of:

producing a flow of hydraulic fluid between the hydraulic drive and the pressure accumulator using the pump in response to signals from the control/automatic regulation unit;

charging, by a charging pump driven by an electric motor, the pressure accumulator with hydraulic fluid from a tank in response to the pressure switch;

closing, by the control/automatic regulation unit, a leakage stop valve installed in a leakage line between the pump and the tank when the car is stopped; and opening, by the control/automatic regulation unit, the leakage stop valve when the pump is started.

* * * * *